United States Patent
Mongia

(10) Patent No.: US 7,957,140 B2
(45) Date of Patent: Jun. 7, 2011

(54) AIR MOVER FOR DEVICE SURFACE COOLING

(75) Inventor: Rajiv Mongia, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/967,679

(22) Filed: Dec. 31, 2007

(65) Prior Publication Data

US 2009/0168332 A1 Jul. 2, 2009

(51) Int. Cl.
*H05K 7/20* (2006.01)

(52) U.S. Cl. ... 361/695; 361/690; 361/694; 165/104.33; 454/184

(58) Field of Classification Search .......... 361/694–697, 361/687, 690, 692, 689, 700; 165/84; 251/129.06
See application file for complete search history.

(56) References Cited

U.S. PATENT DOCUMENTS

| | | | |
|---|---|---|---|
| 5,063,476 A | 11/1991 | Hamadah et al. | |
| 5,285,350 A | 2/1994 | Villaume | |
| 5,313,362 A | 5/1994 | Hatada et al. | |
| 5,331,508 A | 7/1994 | Hosoi et al. | |
| 5,519,585 A | 5/1996 | Jones et al. | |
| 5,694,294 A | 12/1997 | Ohashi et al. | |
| 5,953,206 A | 9/1999 | Jondrow | |
| 6,005,770 A | 12/1999 | Schmitt | |
| 6,027,535 A | 2/2000 | Eberle et al. | |
| 6,181,557 B1 | 1/2001 | Gatti | |
| 6,226,180 B1 | 5/2001 | Ueda et al. | |
| 6,226,182 B1 * | 5/2001 | Maehara | 361/695 |
| 6,229,701 B1 * | 5/2001 | Kung et al. | 361/688 |
| 6,252,160 B1 | 6/2001 | Chang et al. | |
| 6,259,601 B1 | 7/2001 | Jaggers et al. | |
| 6,336,691 B1 | 1/2002 | Maroney et al. | |
| 6,348,653 B1 | 2/2002 | Cho | |
| 6,364,009 B1 | 4/2002 | MacManus et al. | |
| 6,385,043 B1 | 5/2002 | Ueda et al. | |

(Continued)

FOREIGN PATENT DOCUMENTS

DE 202004003310 8/2004

OTHER PUBLICATIONS

U.S. Appl. No. 11/890,613, filed Aug. 6, 2007, entitled: Combination of Laminar Wall Jets with EMI Shielding for Notebook Skin Cooling, inventor Mongia et al.

(Continued)

*Primary Examiner* — Jayprakash N Gandhi
*Assistant Examiner* — Courtney Smith
(74) *Attorney, Agent, or Firm* — Kacvinsky Daisak PLLC

(57) ABSTRACT

Embodiments disclosed herein include an apparatus that includes an component capable of generating heat, an external wall with an interior surface, an air mover to be positioned to generate airflow between the interior surface of the external wall and the component. A vent may then be formed within the external wall to provide for a volume of air for the air mover to create airflow between the interior surface and the component. In some embodiments, the vent may be positioned in relation to the air mover to deflect at least a portion of the heat from the component from reaching the external wall. In some embodiments, a louvered portion may be included; and may be formed on the air mover or at the vent in the external wall. Other embodiments are described.

15 Claims, 4 Drawing Sheets

U.S. PATENT DOCUMENTS

| | | | |
|---|---|---|---|
| 6,421,238 B1 * | 7/2002 | Negishi | 361/695 |
| 6,459,573 B1 | 10/2002 | DiStefano et al. | |
| 6,477,502 B1 | 11/2002 | Ananthpadmanabhan et al. | |
| 6,577,502 B1 | 6/2003 | DiStefano et al. | |
| 6,588,497 B1 * | 7/2003 | Glezer et al. | 165/84 |
| 6,678,157 B1 * | 1/2004 | Bestwick | 361/695 |
| 6,717,808 B2 | 4/2004 | Ueda et al. | |
| 6,724,624 B1 * | 4/2004 | Dodson | 361/695 |
| 6,765,796 B2 | 7/2004 | Hoffman et al. | |
| 6,801,430 B1 | 10/2004 | Pokharna | |
| 6,847,524 B2 | 1/2005 | Tomioka et al. | |
| 6,947,294 B2 | 9/2005 | Lin et al. | |
| 6,972,950 B1 | 12/2005 | Wyatt et al. | |
| 7,031,154 B2 * | 4/2006 | Bash et al. | 361/690 |
| 7,167,363 B1 | 1/2007 | Cushman et al. | |
| 7,173,822 B2 | 2/2007 | Liang et al. | |
| 7,201,651 B2 * | 4/2007 | Su | 454/184 |
| 7,210,946 B2 | 5/2007 | Chen | |
| 7,248,471 B2 | 7/2007 | Wabiszczewicz | |
| 7,251,139 B2 * | 7/2007 | Bhattacharya et al. | 361/719 |
| 7,310,227 B2 | 12/2007 | Kusamoto et al. | |
| 7,403,385 B2 * | 7/2008 | Boone et al. | 361/692 |
| 7,416,481 B2 * | 8/2008 | Baker et al. | 454/184 |
| 2002/0122296 A1 | 9/2002 | Stone et al. | |
| 2003/0121645 A1 * | 7/2003 | Wang | 165/104.26 |
| 2003/0156385 A1 | 8/2003 | Askeland et al. | |
| 2003/0210523 A1 | 11/2003 | Tuttle et al. | |
| 2004/0001316 A1 | 1/2004 | Kamikawa et al. | |
| 2004/0085730 A1 | 5/2004 | Lo | |
| 2004/0123978 A1 | 7/2004 | Hashimoto et al. | |
| 2004/0125558 A1 | 7/2004 | DiStefano | |
| 2004/0217072 A1 | 11/2004 | Bash et al. | |
| 2005/0013116 A1 * | 1/2005 | Pokharna et al. | 361/695 |
| 2005/0207113 A1 | 9/2005 | Tanaka et al. | |
| 2006/0120043 A1 | 6/2006 | Wolford et al. | |
| 2006/0133036 A1 * | 6/2006 | Durney | 361/695 |
| 2006/0193113 A1 | 8/2006 | Cohen et al. | |
| 2007/0064388 A1 | 3/2007 | Uchizono et al. | |
| 2007/0076370 A1 | 4/2007 | Mongia et al. | |
| 2008/0117590 A1 * | 5/2008 | Dey et al. | 361/687 |

OTHER PUBLICATIONS

Guarino, John et al., "Characterization of Laminar Jet Impingement Cooling in Portable Computer Apps" IEEE Transactions of Components & Packaging Tech IEEE SVC CTR, Piscataway, NJ, US, vol. 25, No. 3, Sep. 2002 pp. 337-346.

Vader et al. "Nozzle for Enhanced Impingement Cooling" IP.COM Journal, IP.COM Inc., West Henrietta, NY, US, Aug. 1, 1991, No. of pp. 3.

Int'l Search Report and Written Opinion of the International Searching Authority for PCT No. PCT/US2006/377759, mailed Nov. 8, 2007.

Unknown, "Streetwise: Power Support—4C Vent Laptop Cooling Stand 17", web document, www.streetwise.com.au, Mar. 27, 2003, 2 pages + 1 illustration.

Unknown, "Top 9 Laptop Computer Safty Tips", web document, Laptop Computer Safety, Copyright 2005, 3 pages total.

* cited by examiner

AIR MOVER FOR DEVICE SURFACE COOLING

CROSS-REFERENCE TO RELATED APPLICATIONS

This application includes related subject matter to application Ser. No. 11/244,496, entitled "Apparatus and Method to Efficiently Cool a Computing Device", and filed Sep. 30, 2005.

This application includes related subject matter to application Ser. No. 11/890,613, entitled "Electromagnetic Interference Shielding for Device Cooling", and filed Aug. 6, 2007.

FIELD OF INVENTION

The invention relates to the field of thermal management of devices, and in particular the cooling of a device's surface using air movers.

BACKGROUND

Electronic devices are both shrinking in size and including additional heat generating components. Dissipation of the heat generated by these components has become more important because they may make the device uncomfortable to hold or increase the temperature in a particular region within the device above an operable limit.

With respect to holding the devices, the external surface of the device can get quite warm, if not hot, to the touch. This problem can become acute in some devices, such as electronic devices, small mobile computers, servers and other computing and electronic devices where components are in close proximity to the external surface.

Conventionally, devices are cooled using vent systems in the external surface of the device. Alternative approaches or improvements may be advantageous due to the confined space, reduced weight, and decreased airflow within the device.

BRIEF DESCRIPTION OF THE DRAWINGS

Various advantages of embodiments of the invention will become apparent to one skilled in the art by reading the following specification and appended claims, and by referencing the following drawings, in which:

DETAILED DESCRIPTION

Described herein are methods and devices to decrease the temperatures of i) the external walls of computing devices, ii) the exhaust air leaving a computing devices, and iii) the electronic components within the computing devices. In the following description, numerous specific details are set forth. One of ordinary skill in the art, however, will appreciate that these specific details are not necessary to practice embodiments of the invention.

While certain exemplary embodiments of the invention are described and shown in the accompanying drawings, it is to be understood that such embodiments are merely illustrative and not restrictive of the current invention, and that this invention is not restricted to the specific constructions and arrangements shown and described because modifications may occur to those ordinarily skilled in the art.

In other instances, known semiconductor fabrication processes, techniques, materials, equipment, etc., have not been set forth in particular detail in order to highlight some embodiments of the invention.

Figure 1A:
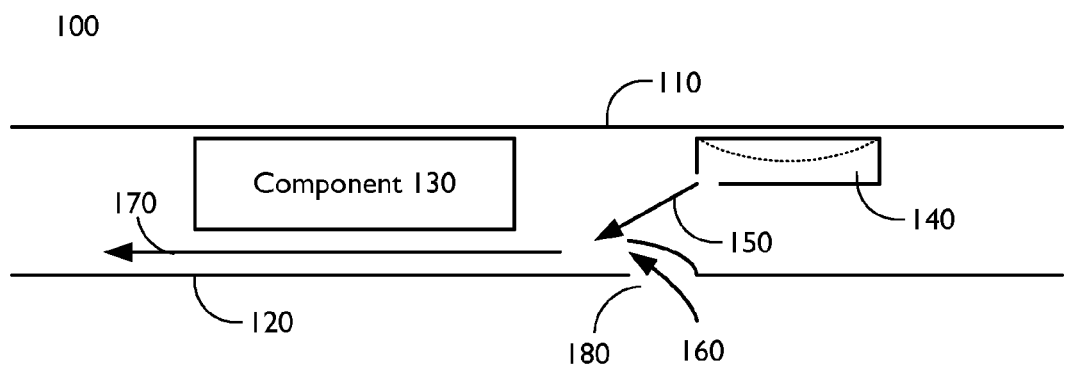
FIG. 1A illustrates an embodiment of a cross-sectional view of an air mover to provide airflow via a vent, the airflow to be directed between an external wall's internal surface and a component capable of generating heat, according to some embodiments of the invention.

FIG. 1A illustrates an embodiment of a cross-sectional view of an apparatus 100 with an air mover 140 to provide airflow 150 via a vent 180. Airflow 150 may be directed between an internal surface of external walls 110 and 120, although as illustrated the bulk of the space may be along the external wall 120, and a component 130, which is capable of generating heat, according to some embodiments of the invention. The airflow 150 may entrain airflow 160 and direct it in combination with the airflow 150 to form airflow 170. According to some embodiment, the airflow 160, as well as the entraining airflows of other embodiments, may include ambient air.

In some embodiments, an apparatus 100 may include the component 130, which may be capable of generating heat, the external wall 120 with an interior surface, the air mover 140, which in some embodiments may be a synthetic jet or enclosed piezoelectric diaphragm. Moreover, the air mover 140, as well as the other air movers of embodiments of the invention, may have more than one outlet for generating airflows. As one of ordinary skill in the relevant art would appreciate based at least on the teachings provided herein, an array of outlets may be present in an air mover.

Furthermore, the air movers of embodiments of the invention may operate at various cycle rates, as well as be operated at either or both (alternatively) a steady or fluctuating rate. In some embodiments, the air movers of embodiments may have various shapes and sizes (form factors—size, aspect ratio, volume, weight, etc.), and may be formed of various materials (plastic, metal, fiber, etc.), as one of ordinary skill in the relevant art would appreciate based at least on the teachings provided herein. In some embodiments, the configuration and/or composition of the air mover may depend on the dimensions of the apparatus and any computer device in or on which the apparatus may be placed.

In some embodiments, the air mover 140 may be positioned to generate airflow 150 between the interior surface of the external wall 120 and the component 130. According to some embodiments, the interior surfaces may run along confined spaces between the external wall 120 and the component 130. Similarly, there may be confined spaces in all of the embodiments described elsewhere herein.

In some embodiments, the vent 180 may be formed within the external wall 120 to provide for a volume of air for the air mover 140 to create airflow 170 between the interior surface of the external wall 120 and the component 130. Also, in some embodiments, the vent 180 may be positioned in relation to the air mover 140 to deflect at least a portion of the heat from the component 130 from reaching the external wall 120.

Figure 1B:
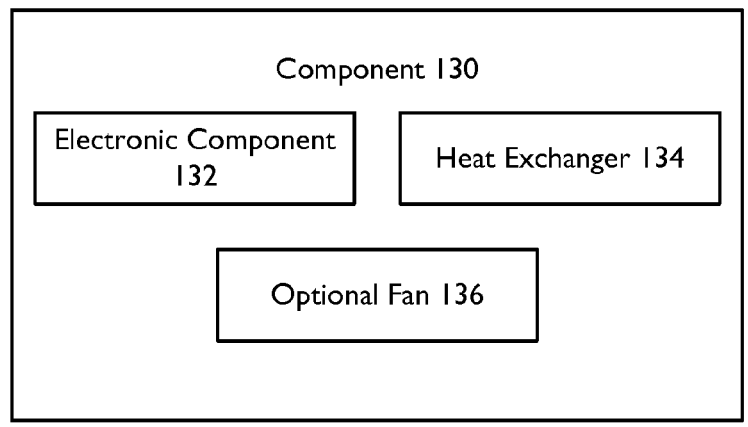
FIG. 1B illustrates a block diagram of a component capable of generating heat, according to some embodiments of the invention.

FIG. 1B illustrates a block diagram of the component 130, which may be capable of generating heat, according to some embodiments of the invention. In some embodiments, the component 130 may include an electronic component 132, such as, but not limited to a central processing unit (CPU), processor, one or more cores of a processor, chipset, or memory, caches, hard drive, etc., which may generate heat in certain circumstances. The component 130 may also include a heat exchanger 134 and/or a fan 136 or other air mover, as one of ordinary skill in the art would appreciate based at least on the teachings provided herein.

In some embodiments of the invention, the component 130, as well as the components described below, such as, but not limited to, components 230 and 330, may not include all of the above sub-components, or they may include additional components, as one of ordinary skill in the relevant art would appreciate based at least on the teachings described herein. According to some embodiments, the fan 136 may operate as a primary air mover and thus may provide the bulk of the airflow. This may not be the case, in most embodiments, of FIGS. 1A and 2, but may be the case with respect to FIG. 3. As such, the air mover 140 may operate to cool the combined airflow, according to some embodiments; or it may operate to dilute the exhaust (combined) airflow, such as in FIG. 3.

Figure 2:
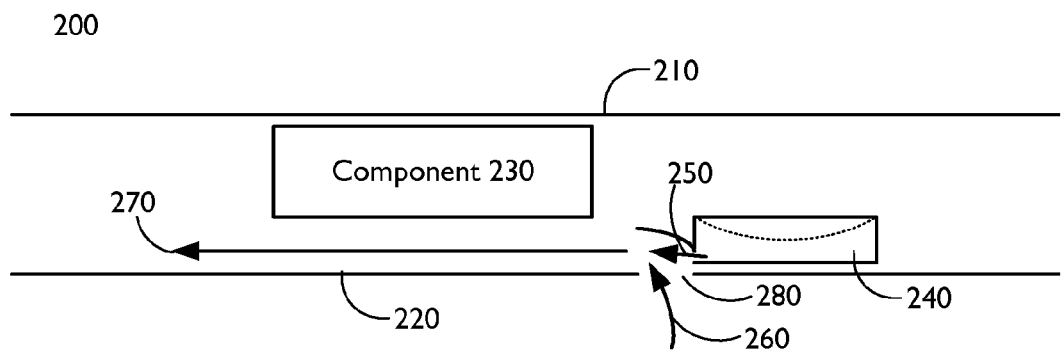
FIG. 2 illustrates an embodiment of a cross-sectional view of an air mover to provide airflow with a vent, the airflow to be directed between an external wall's internal surface and a component capable of generating heat, according to some embodiments of the invention.

FIG. 2 illustrates an embodiment of a cross-sectional view of an apparatus 200 with an air mover 240 to provide airflow 250 with a vent 280. In some embodiments, airflow 270 may be generated by the directed airflow 250 in combination with entrained airflow 260. As such, the airflow 270 may be directed between an internal surface of external walls 210 and 220, although as illustrated the bulk of the space may be along the external wall 220, and a component 230, which may be capable of generating heat, according to some embodiments of the invention. In some embodiments, as described in additional detail elsewhere herein, the air mover 240 may include a louvered portion (as shown) to direct the airflows 250 and 260.

Figure 3:
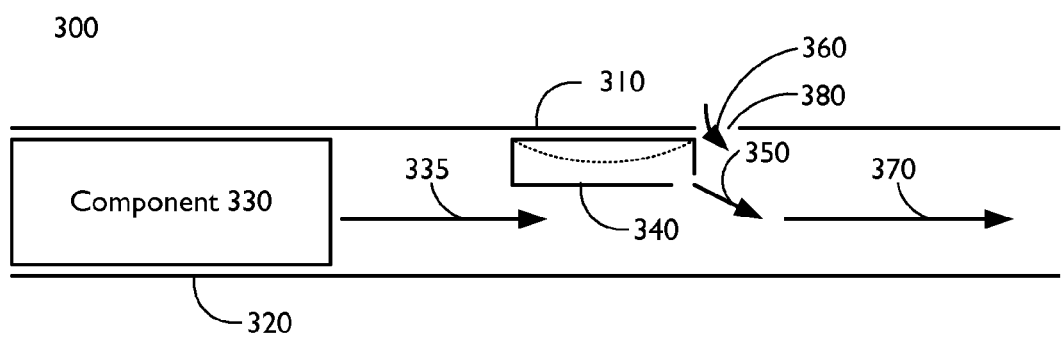
FIG. 3 illustrates an embodiment of a cross-sectional view of an air mover to provide airflow via a vent to be directed along from an external wall's internal surface and to draw air away from a component capable of generating heat, according to some embodiments of the invention.

FIG. 3 illustrates an embodiment of a cross-sectional view of an apparatus 300 with an air mover 340 to provide airflow 350 via a vent 380 directed along an interior surface of external walls 310 and 320. As such, the air mover 340 may operate as a secondary air mover in some embodiments where the component 330 includes a fan as a primary air mover, as described elsewhere herein. In some embodiments, the air mover 340 may draw lower temperature airflow 360 via vent 380 forming a combined airflow 370 with a lower average temperature than the airflow 335 from the component 330. In some embodiments, the air mover 340 may not include a louvered portion (as shown) to direct the airflows 350 and 360.

Moreover, in some embodiments, the configuration in FIG. 3 may be used as a downstream configuration, where the air mover 340 operates to draw air past the component 330. In the embodiments of FIGS. 1A and 2, the air movers are upstream of their respective components and operate to push air around or by the components.

Figure 4A:
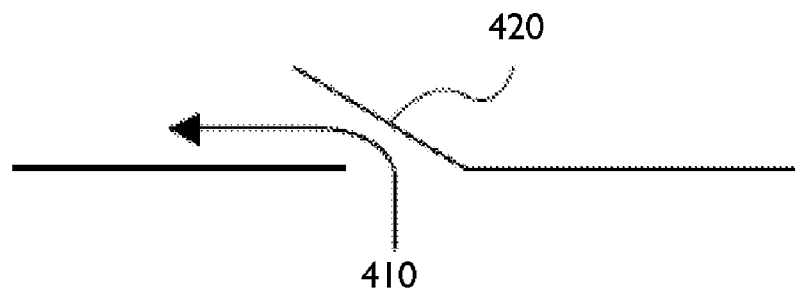
FIGS. 4A-4C illustrate various louvered portions to assist in the channeling of airflow, according to some embodiments of the invention.
Figure 4B:
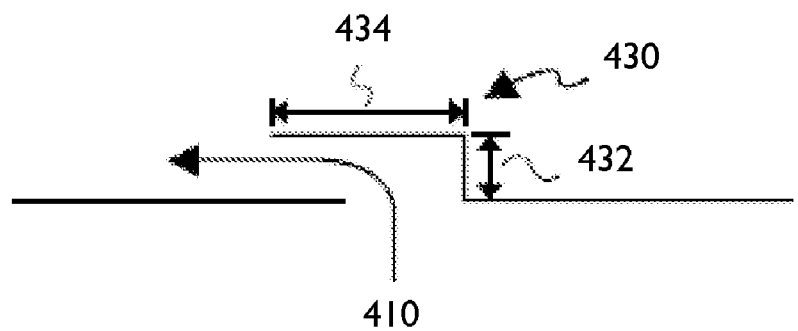
Figure 4C:
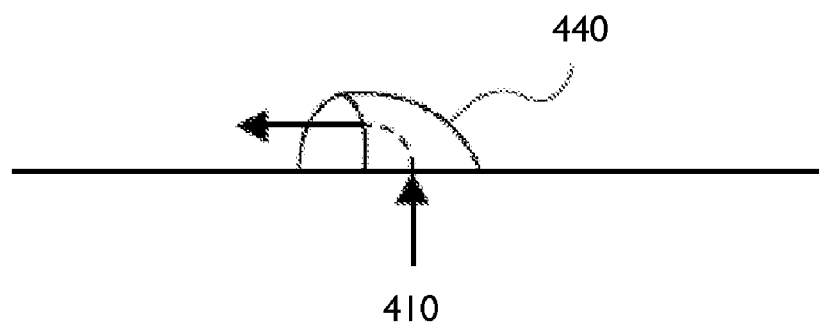

FIGS. 4A-4C illustrate various louvered portions to assist in the channeling of airflow, according to some embodiments of the invention, such as, but without limitation, the embodiments shown and described with respect to FIGS. 1A and 2. Moreover, through modification to the embodiments shown and described with respect to FIG. 3, one of ordinary skill in the relevant art would appreciate, based at least on the teachings described herein, how to implement various louvered portions to assist in the channeling of airflow.

In FIG. 4A, an angled louvered vent 420 is illustrated according to some embodiments of the invention. The angled louvered vent 420 may have any angle with respect to the external wall, such as, but not limited to external walls 120, 220 and/or 320, that is sufficient to form a directed flow of incoming airflow 410, but more particularly may have an angle with respect to the external wall in the approximate range of 15 degrees to 60 degrees.

FIG. 4B illustrates a squared of chamber louvered vent 430 according to some embodiments of the invention. The height 432 of the squared off chamber may vary depending on the dimensions of the interior of the apparatus, such as but not limited to the apparatuses 100, 200 and/or 300. In some embodiments, where the apparatuses 100, 200 and/or 300 are a laptop computer, the height 432 of the squared off chamber may be in the approximate range of 1 millimeter (mm)-3 mm. The length 434 of the squared off chamber louvered vent 430 may be any length sufficient to form the air flow 410 along the external wall.

FIG. 4C illustrates a hooded louvered vent 440. The hooded louvered vent 440 may be curved, angled, or squared and forms an enclosed louvered vent 440 to more specifically focus the airflow 410. The hooded louvered vent 440 may have a width and a height sufficient to create an airflow 410 that is capable of reducing the temperature of the apparatus, such as, but not limited to the apparatuses 100, 200 and/or 300.

In some embodiments, the louvered portion is part of a row of louvered portions that may be positioned to direct airflows along the interior surface of the external wall.

In some embodiments, the vents 180, 280 and/or 380, and the louvered portions, if present, may be formed in a row on the apparatus 100, 200, and/or 300. The multiple airflows 160, 260, and/or 360 may form an almost continuous series of airflows 170, 270 and/or 335/370 along the interior surface of the external walls 120, 220, and/or 320. In some embodiments, each of the vents 180, 280 and/or 380 may run a substantial width or length of the apparatus 100, 200, and/or 300. Moreover, according to some embodiments, many variations of length, width, and positioning of the vents may be implemented depending on the placement of the components of the apparatus, as one of ordinary skill in the relevant arts would appreciate based at least on the teachings described herein.

Furthermore, as one of ordinary skill in the relevant arts would appreciate based at least on the teachings described herein, the embodiments of the external walls, the vents, and the louvered portions may be formed by machining, stamping, or molding, for example and without limitation. They may be formed of any material such as plastic polymers or metal, for example and without limitation, such that sufficient structure, housing, and if necessary, support, is provided, according to some embodiments. In some embodiments, they may be part of a computing device, such as, but not limited to a mobile computer, personal computer, a server, or the like.

Figure 5:
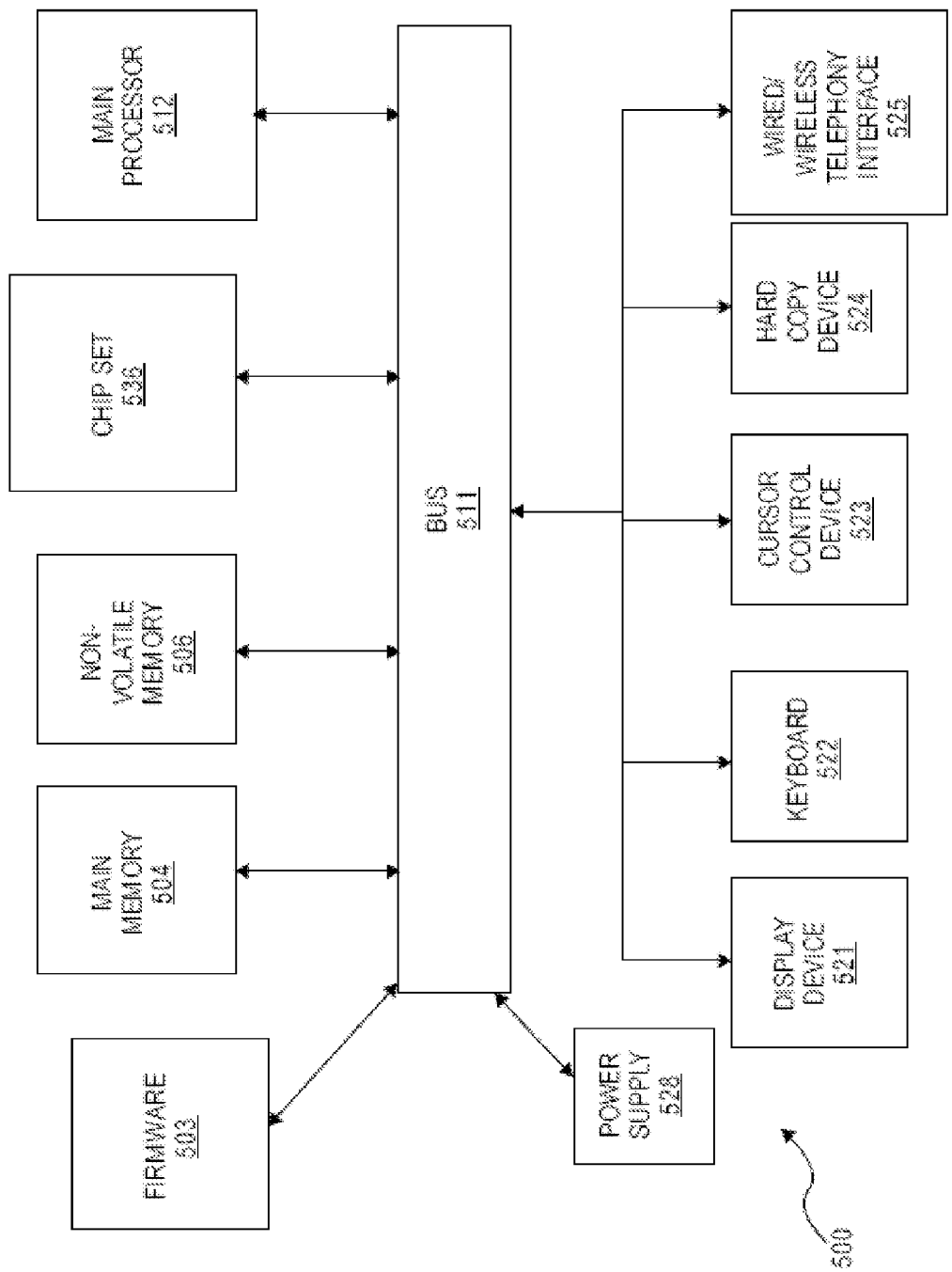
FIG. 5 illustrates of a computing device system that may employ embodiments of the air mover with vents, according to some embodiments of the invention.

FIG. 5 illustrates of a computing device system 500 that may employ embodiments of the air mover with vents, according to some embodiments of the invention. In some embodiments, the computing device system 500 may include a housing to contain one or more components 130, 230, and/or 330. Moreover, the computing device system 500 may be one of a mobile computer, including, but not limited to laptop computers, notebook computers, tablet PCs, personal digital assistants (PDAs), smartphones, or a mobile telephone; a personal computer; or a server.

With respect to the specific components, according to some embodiments, FIG. 5 illustrates a block diagram of an example computer system 500 that may use an embodiment of the apparatuses 100, 200 and/or 300 to cool the external walls or the components 130, 230 and/or 330 of a computing device. In some embodiments, computer system 500 includes a communication mechanism or bus 511 for communicating information, and an integrated circuit component such as a processor 512 coupled with bus 511 for processing information. One or more of the components 130, 230, and/or 330 or other components in the computer system 500 such as the processor 512 or a chip set 536 may be cooled by an embodiment of the apparatus, such as one or more of apparatuses 100, 200, and/or 300 to cool the external walls 120, 220 and/or 320 of the computing device 500.

Computer system 500 further include a random access memory (RAM) or other dynamic storage device 504 (referred to as main memory) coupled to bus 511 for storing information and instructions to be executed by processor 512. Main memory 504 also may be used for storing temporary variables or other intermediate information during execution of instructions by processor 512.

Firmware 503 may be a combination of software and hardware, such as Electronically Programmable Read-Only Memory (EPROM) that has the operations for the routine recorded on the EPROM. The firmware 503 may embed foundation code, basic input/output system code (BIOS), or other similar code. The firmware 503 may make it possible for the computer system 500 to boot itself.

Computer system 500 may also includes a read-only memory (ROM) and/or other static storage device 506 coupled to bus 511 for storing static information and instructions for processor 512. The static storage device 506 may store OS level and application level software.

Computer system 500 may further be coupled to a display device 521, such as a cathode ray tube (CRT) or liquid crystal display (LCD), coupled to bus 511 for displaying information to a computer user. A chipset, such as chipset 536, may interface with the display device 521.

An alphanumeric input device (keyboard) 522, including alphanumeric and other keys, may also be coupled to bus 511 for communicating information and command selections to processor 512. An additional user input device is cursor control device 523, such as a mouse, trackball, trackpad, stylus, or cursor direction keys, coupled to bus 511 for communicating direction information and command selections to processor 512, and for controlling cursor movement on a display device 512. A chipset, such as chip set 536, may interface with the input output devices.

Another device that may be coupled to bus 511 is a hard copy device 524, which may be used for printing instructions, data, or other information on a medium such as paper, film, or similar types of media. Furthermore, a sound recording and playback device, such as a speaker and/or microphone (not shown) may optionally be coupled to bus 511 for audio interfacing with computer system 500. Another device that may be coupled to bus 511 is a wired/wireless communication capability 525.

Computer system 500 may have a power supply 528 such as a battery, alternating current (AC) power plug connection and rectifier, etc. In some embodiments, the battery or power supply 528 may provide power to the computer system 500.

Several embodiments of the invention have thus been described. However, those of ordinary skill in the art will recognize that the invention is not limited to the embodiments described, but can be practiced with modification and alteration, including the equivalent substitution of materials, processes, dimensions, etc., within the scope and spirit of the appended claims that follow.

What is claimed is:

1. An apparatus, comprising:
a component capable of generating heat;
an external wall with an interior surface;
an air mover to be positioned to generate a directed airflow between the interior surface of the external wall and the component; and
a vent formed within the external wall to provide an entrained airflow that is combined with the directed airflow to create a combined airflow between the interior surface and the component, wherein the vent is positioned in relation to the air mover to deflect at least a portion of the heat from the component from reaching the external wall, the vent includes a louvered portion to extend from the interior surface of the external wall and is formed as a fixed part of the external wall, the component includes an electronic component and a fan; and wherein the fan provides a relatively large portion of the airflow and the air mover dilutes the airflow with the entrained airflow from the vent.

2. The apparatus of claim 1, wherein the electronic component is a central processing unit (CPU), chipset, or memory.

3. The apparatus of claim 1, wherein the air mover is a synthetic jet.

4. The apparatus of claim 1, wherein the louvered portion is formed as a squared off chamber, a curved shape, or at an angle, the angle being in an approximate range between 15 degrees and 60 degrees with respect to the external wall.

5. The apparatus of claim 1, wherein the louvered portion is part of a row of louvered portions positioned to direct a combined airflow along the interior surface.

6. The apparatus of claim 1, wherein the louvered portion is part of a manifold of louvered portions positioned to direct a combined airflow along the interior surface.

7. A computing device, comprising:
a component capable of generating heat;
a housing containing the component;
an external wall of the housing, wherein the external wall has an interior surface;
an air mover to be positioned to generate a directed airflow between the interior surface of the external wall and the component; and
a vent formed within the external wall to provide an entrained airflow that is combined with the directed airflow to create a combined airflow between the interior surface and the component, wherein the vent is positioned in relation to the air mover to deflect at least a portion of the heat from the component from reaching the external wall, the vent includes a louvered portion to extend from the interior surface of the external wall and is formed as a fixed part of the external wall, the component includes an electronic component and a fan; and wherein the fan provides a relatively large portion of the airflow and the air mover dilutes the airflow with the entrained airflow from the vent.

8. The computing device of claim 7, wherein the electronic component is a central processing unit (CPU), chipset, or memory.

9. The computing device of claim 7, wherein the air mover is a synthetic jet.

10. The computing device of claim 7, wherein the louvered portion is formed as a squared off chamber, a curved shape, or at an angle, the angle being in an approximate range between 30 degrees and 60 degrees with respect to the external wall.

11. The computing device of claim 7, wherein the louvered portion is part of a row of louvered portions positioned to direct a combined airflow along the interior surface.

12. The computing device of claim 7, wherein the louvered portion is part of a manifold of louvered portions positioned to direct a combined airflow along the interior surface.

13. The computing device of claim 7, further comprising:
a battery to power the computing device.

14. The computing device of claim 7, wherein the housing has one or more openings for the flow of air, which are formed in the external wall.

15. The computing device of claim 7, wherein the device is one of a mobile computer, personal computer, or server.

* * * * *

UNITED STATES PATENT AND TRADEMARK OFFICE
CERTIFICATE OF CORRECTION

PATENT NO.        : 7,957,140 B2
APPLICATION NO.   : 11/967679
DATED             : June 7, 2011
INVENTOR(S)       : Rajiv Mongia It is certified that error appears in the above-identified patent and that said Letters Patent is hereby corrected as shown below:

On the Title Page, in item (57), in Abstract, in column 2, line 2, delete "an" and insert -- a --, therefor.

Signed and Sealed this
Sixteenth Day of August, 2011

David J. Kappos
*Director of the United States Patent and Trademark Office*